United States Patent
Malpani et al.

(10) Patent No.: US 8,275,771 B1
(45) Date of Patent: Sep. 25, 2012

(54) NON-TEXT CONTENT ITEM SEARCH

(75) Inventors: Radhika Malpani, Palo Alto, CA (US);
Arcot J. Preetham, San Jose, CA (US);
Omkar Mate, Mountain View, CA (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 12/795,239

(22) Filed: Jun. 7, 2010

Related U.S. Application Data

(60) Provisional application No. 61/308,547, filed on Feb. 26, 2010.

(51) Int. Cl.
*G06F 17/30* (2006.01)

(52) U.S. Cl. ...................................................... 707/737

(58) Field of Classification Search .................. 707/736, 707/737, 738, 749, 776
See application file for complete search history.

(56) References Cited

U.S. PATENT DOCUMENTS

| | | | |
|---|---|---|---|
| 5,724,521 A | 3/1998 | Dedrick |
| 5,740,549 A | 4/1998 | Reilly et al. |
| 5,848,397 A | 12/1998 | Marsh et al. |
| 5,918,014 A | 6/1999 | Robinson |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,389,372 B1 | 5/2002 | Glance et al. |
| 6,401,075 B1 | 6/2002 | Mason et al. |
| 6,549,896 B1 | 4/2003 | Candan et al. |
| 6,594,673 B1 | 7/2003 | Smith et al. |
| 6,792,419 B1 | 9/2004 | Raghavan |
| 6,985,882 B1 | 1/2006 | Del Sesto |
| 7,039,599 B2 | 5/2006 | Merriman |
| 7,136,875 B2 | 11/2006 | Anderson et al. |

(Continued)

FOREIGN PATENT DOCUMENTS

EP 1 544 729 6/2005

(Continued)

OTHER PUBLICATIONS

U.S. Appl. No. 11/733,734, filed Apr. 10, 2007, Baluja and Jing.

(Continued)

*Primary Examiner* — Hung T Vy
(74) *Attorney, Agent, or Firm* — Fish & Richardson P.C.

(57) ABSTRACT

Methods, systems, and apparatus, including computer programs encoded on a computer storage medium, for selecting labels for a non-text content item. In one aspect, a method receives a set of initial labels for a non-text content item, wherein the set of initial labels specifies text that has been identified as descriptive of the non-text content item and a web page to which the text corresponds. Initial labels corresponding to sets of matching web pages are grouped into separate initial label groups that correspond to each set of matching web pages. Sets of matching labels are grouped into other separate initial label groups that correspond to the sets of matching labels. One or more words that are included in at least a threshold number of the separate label groups are selected as final labels for the non-text content item.

32 Claims, 4 Drawing Sheets

U.S. PATENT DOCUMENTS

| | | | |
|---|---|---|---|
| 7,689,682 B1 | 3/2010 | Eldering et al. | |
| 8,055,664 B2 * | 11/2011 | Baluja et al. | 707/749 |
| 2002/0023230 A1 | 2/2002 | Bolnick et al. | |
| 2002/0116466 A1 | 8/2002 | Trevithick et al. | |
| 2002/0120506 A1 | 8/2002 | Hagen | |
| 2002/0124053 A1 | 9/2002 | Adams et al. | |
| 2003/0050977 A1 | 3/2003 | Puthenkulam et al. | |
| 2004/0042599 A1 | 3/2004 | Zaner et al. | |
| 2004/0088325 A1 | 5/2004 | Elder et al. | |
| 2004/0122803 A1 | 6/2004 | Dom et al. | |
| 2004/0143841 A1 | 7/2004 | Wang et al. | |
| 2004/0148275 A1 | 7/2004 | Achlioptas | |
| 2004/0215793 A1 | 10/2004 | Ryan et al. | |
| 2004/0267604 A1 | 12/2004 | Gross | |
| 2005/0091202 A1 | 4/2005 | Thomas | |
| 2005/0114325 A1 | 5/2005 | Liu et al. | |
| 2005/0125308 A1 | 6/2005 | Puentes et al. | |
| 2005/0125408 A1 | 6/2005 | Somaroo et al. | |
| 2005/0144069 A1 | 6/2005 | Wiseman et al. | |
| 2005/0149395 A1 | 7/2005 | Henkin et al. | |
| 2005/0154639 A1 | 7/2005 | Zetmeir | |
| 2005/0171832 A1 | 8/2005 | Hull et al. | |
| 2005/0198031 A1 | 9/2005 | Pezaris et al. | |
| 2005/0216300 A1 | 9/2005 | Appelman et al. | |
| 2005/0234953 A1 * | 10/2005 | Zhang et al. | 707/101 |
| 2005/0278433 A1 | 12/2005 | Levi et al. | |
| 2006/0004704 A1 | 1/2006 | Gross | |
| 2006/0031121 A1 | 2/2006 | Speicher | |
| 2006/0085259 A1 | 4/2006 | Nicholas et al. | |
| 2006/0136098 A1 | 6/2006 | Chitrapura et al. | |
| 2006/0165040 A1 | 7/2006 | Rathod et al. | |
| 2006/0184617 A1 | 8/2006 | Nicholas et al. | |
| 2006/0190225 A1 | 8/2006 | Grand | |
| 2006/0200435 A1 | 9/2006 | Flinn et al. | |
| 2006/0204142 A1 | 9/2006 | West et al. | |
| 2006/0218577 A1 | 9/2006 | Goodman et al. | |
| 2006/0247940 A1 | 11/2006 | Zhu et al. | |
| 2006/0248573 A1 | 11/2006 | Pannu et al. | |
| 2006/0271460 A1 | 11/2006 | Hanif | |
| 2006/0282328 A1 | 12/2006 | Gerace et al. | |
| 2006/0294134 A1 | 12/2006 | Berkhim et al. | |
| 2007/0005341 A1 | 1/2007 | Burges et al. | |
| 2007/0043688 A1 | 2/2007 | Kountz et al. | |
| 2007/0043766 A1 | 2/2007 | Nicholas et al. | |
| 2007/0050446 A1 | 3/2007 | Moore | |
| 2007/0106551 A1 | 5/2007 | McGucken | |
| 2007/0121843 A1 | 5/2007 | Atazky et al. | |
| 2007/0124721 A1 | 5/2007 | Cowing et al. | |
| 2007/0218900 A1 | 9/2007 | Abhyanker | |
| 2008/0010144 A1 * | 1/2008 | Chatwin et al. | 705/14 |
| 2008/0010275 A1 | 1/2008 | Lee et al. | |
| 2008/0091834 A1 | 4/2008 | Norton | |
| 2008/0103784 A1 | 5/2008 | Wong et al. | |
| 2008/0103877 A1 | 5/2008 | Gerken | |
| 2008/0104079 A1 | 5/2008 | Craig | |
| 2008/0104225 A1 | 5/2008 | Zhang et al. | |
| 2008/0120308 A1 | 5/2008 | Martinez et al. | |
| 2008/0120411 A1 | 5/2008 | Eberle | |
| 2008/0126476 A1 | 5/2008 | Nicholas et al. | |
| 2008/0140650 A1 | 6/2008 | Stackpole | |
| 2008/0155080 A1 | 6/2008 | Marlow et al. | |
| 2008/0159590 A1 | 7/2008 | Yi et al. | |
| 2008/0162431 A1 | 7/2008 | Xu et al. | |
| 2008/0195657 A1 | 8/2008 | Naaman et al. | |
| 2008/0215416 A1 | 9/2008 | Ismalon et al. | |
| 2008/0243607 A1 | 10/2008 | Rohan et al. | |
| 2008/0249966 A1 | 10/2008 | Luege Mateos | |
| 2008/0275899 A1 | 11/2008 | Baluja et al. | |
| 2009/0024548 A1 | 1/2009 | Zhu et al. | |
| 2009/0063284 A1 | 3/2009 | Turpin et al. | |
| 2009/0076800 A1 | 3/2009 | Li et al. | |
| 2009/0112701 A1 | 4/2009 | Turpin et al. | |
| 2009/0297050 A1 * | 12/2009 | Li et al. | 382/225 |
| 2010/0138451 A1 * | 6/2010 | Henkin et al. | 707/803 |
| 2011/0072047 A1 * | 3/2011 | Wang et al. | 707/776 |

FOREIGN PATENT DOCUMENTS

| | | |
|---|---|---|
| JP | 11-265369 | 9/1999 |
| JP | 2002-132604 | 5/2002 |
| WO | 97/21183 | 6/1997 |
| WO | 00/68860 | 11/2000 |
| WO | 2004/111771 | 12/2004 |
| WO | 2006/121575 | 11/2006 |

OTHER PUBLICATIONS

U.S. Appl. No. 12/763,466, filed Apr. 20, 2010, Rosenberg.
U.S. Appl. No. 12/763,489, filed Apr. 20, 2010, Rosenberg.
U.S. Appl. No. 60/522,718, Liew et al.
U.S. Appl. No. 95/001,073, Reexam of Stone.
U.S. Appl. No. 95/001,069, Reexam of Stone.
U.S. Appl. No. 95/001,068, Reexam of Stone.
U.S. Appl. No. 95/001,061, Reexam of Stone.
Accounts website, [online] [retrieved from the internet on Jul. 29, 2004] at http://www.cs.rice.edu/~ssiyer/accounts/, 6 pages.
Adamic et al., "A Social Network Caught in the Web," at http://firstmonday.org/issues/issue8_6/adamic/, as available via the Internet and printed on Jul. 28, 2004.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
AdStar.com website archive from www.Archive.org, Apr. 12, 1997, and Feb. 1, 1997.
Amazon.com, "New Seller FAQ," at http://pages.amazon.com/exec/obidos/tg/browse/-/1161274/002-2835726-5513622 as available via the Internet and printed on Jul. 29, 2004.
Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.
Azran, "The Rendezvous Algorithm: Multiclass Semi-Supervised Learning with Markov Random Walks," *ICML*, 2007, 8 pages.
Baluja and Rowley, "Boosting Sex Identification Performance" *Intl J Computer Vision*, 2007, 71(1) 111-119, 2007, retrieved from the internet at http://portal.acm.org/toc.cfm?id=J325&type=periodical&coll=&dl=ACM&CFID=15151515&CFTOKEN=6184618.
Baluja et al., Video suggestion and discover for YouTube: Taking random walks through the view graph:, in *Proc. 17$^{th}$ International World Wide Web Conference (WWW)*, 2008 to appear.
Baseview Products, Inc., AdManager Pro Administrator's Manual v. 2.0, Jun. 1998.
Baseview Products, Inc., ClassManagerPro Administration and Receivables Manual v. 1.0.5, Feb. 1, 1997.
Bay et al., "surf: Speeded up robust features", in *Proc. 9$^{th}$ International European Conference on Computer Vision (ECCV)*, pp. 404-417, 2006.
Belongie et al, "Shape matching and object recognition using shape contexts", *IEEE Transactions on Pattern Analysis and Machine Intelligence (TPAMI)*, vol. 24, No. 24, pp. 509-522, 2002.
Boccaletti et al., "Complex Networks: Structure and Dynamics," *Physics Reports*, 2006, 424:175-308.
Brin et al., "The Anatomy of a Large-Scale Hypertextual Web Search Engine" *Computer Networks*, 1998, pp. 1-26.
Business Wire, "Global Network, Inc. Enters Into agreement in Principle with Major Advertising Agency," Oct. 4, 1999.
Carson et al., "Blob-world: image segmentation using expectation-maximization and its application to image querying", *IEEE transactions on Pattern Analysis and Machine Intelligence (TPAMI)*, vol. 24, No. 8, pp. 1026-1038, 2002.
Chakrabarti et al., "Mining the Web's Link Structure" IEEE *Computer* Magazine, Aug. 1999, pp. 60-67.
Chum O. et al., "Total Recall: Automatic Query Expansion with a Generative Feature Model for Object Retrieval", [online]*ICCV07*(1-8) [retrieved on Apr. 22, 2010], UTC from IEEE Xpore.

Cui J., et al., "Real Time Google and Live Image Search Re-ranking", ACM International Conference on Multimedia 2008, pp. 729-732, 2008.

Dalal and Triggs, "Histograms of Oriented Gradients for Human Detection," *Proc IEEE Conf Computer Vision and Pattern Recognition*, Jun. 2005, pp. 886-893.

Datar et al., Locality-sensitive hashing scheme based on p-stable distributions:, in *Proc. 20th Symposium on Computational Geometry (SCG)*, pp. 253-262, 2004.

Datta R. et al., "Image Retrieval: Ideas, Influences and Trends of the New Age", ACM *Computing Surveys*, vol. 40, No. 2, article 5, pp. 1-60, 2008.

Dedrick, A Consumption Model for Targeted Electronic Advertising, Intel Architecture Labs, IEEE, 1995, pp. 41-49.

Dedrick, Interactive Electronic Advertising, IEEE, 1994, pp. 55-66.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.txt, as available via the Internet and printed Jul. 28, 2004.

EBAY.COM, "How to Bid," at http://pages.ebay.com/help/welcome/bid.html as available via the Internet and printed on Jul. 29, 2004.

EBAY.COM, "How to Sell," at http://pages.ebay.com/help/welcome/sell.html as available via the Internet and printed on Jul. 29, 2004.

EBAY.COM, "What is eBay?" at http://pages.ebay.com/help/welcome/questions/about-ebay.html as available via the Internet and printed on Jul. 29, 2004.

International Search Report/Written Opinion in PCT/US2008/062263 mailed Jan. 1, 2008, 13 pages.

International Search Report/Written Opinion in PCT/US2008/62285 mailed Dec. 5, 2008, 12 pages.

International Preliminary Report on Patentability in PCT/US/2008/62885 mailed Nov. 12, 2009, 8 pages.

International Preliminary Report on Patentability in PCT/US2008/062263 mailed Nov. 12, 2009, 7 pages.

Fergus et al., "A visual category filter for Google images," in *Proc. 8th European Conference on Computer Vision (ECCV)*, pp. 242-256, 2004.

Fergus et al., "Object class recognition by unsupervised scale-invarint learning" in *Proc. Conference on Computer Vision and Pattern Recognition (CVPR)*, vol. 2, pp. 264-271, 2003.

Frey et al., "clustering by passing messages between data points", *Science*, vol. 315, pp. 972-276, 2007.

Friedman et al., Bayesian network classifiers *Machine Learning*, vol. 29, pp. 131-163, 1997.

Frome A., "Image Retrieval and Classification Using Local Distance Functions", Proceedings of Neural Information Processing Systems (*NIPS*) pp. 417-424, 2006.

Frome et al., "Learning globally-consistent local distance functions for shape-based image retrieval and classification", in *Proc. 11th IEEE International Conference on Computer Vision (ICCV)*, pp. 1-8, 2007.

Gibson et al., "Inferring Web Communities from Link Topology," *Proc 9th ACM Conference on Hypertex and Hypermedia*, 1998, 10 pages.

Gionis et al., "Similarity Search in High Dimensions via Hashing," *Proc 25th Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf.

Harris et al., "A combine corner and edge detector", in *Proc. 4th Alvey Vision Conference*, pp. 147-151, 1988.

Haveliwala et al "Topic-Sensitive PageRank" by. *IEEE Transactions on Knowledge and Data Engineering*, 2003, 10 pages.

He et al., "Imagerank: spectral techniques for structural analysis of image database", in *Proc. International Conference on Multimedia and Expo*, vol. 1, pp. 25-28, 2002.

Herlocker et al., "Evaluating Collaborative Filtering Recommender Systems" *ACM Transactions on Information Systems*, vol. 22, No. 1, Jan. 2004, pp. 5-53.

Hsu et al., "Video search reranking through random walk over document-level context graph" in *Proc. 15th International Conference on Multimedia*, pp. 971-980, 2007.

Indyk et al., "Approximate nearest neighbor-towards removing the curse of dimensionality", in *Proc. 30th ACM Symp. On Computational Theory*, pp. 604-613, 1998.

Indyk, P. "Stable Distributions, Pseudorandom Generators, Embeddings, and Data Stream Computation", in *Proc. 41st IEEE Symposium on Foundations of Computer Science (FOCS)*, pp. 189-197, 2000.

Information Access Technologies, Inc., Aaddzz brochure, "The best Way to Buy and Sell Web Advertising Space," 1997.

Information Access Technologies, Inc., Aaddzz.com website archive from www.Archive.org, archives on Jan. 30, 1998.

Jegou H. et al., "A contextual dissimilarity measure for accurate and efficient image search", [online] *CVPR07*(1-8) [retrieved on Apr. 22, 2010], UTC from IEEE Xplore.

Jeh and Widom, "SimRank: A Measure of Structural-Context Similarity," *Proc 8th ACM SIGKDD international conference on knowledge discovery and data mining*, Jul. 2002, pp. 538-543.

Jing et al., "Canonical image selection from the web", in *Proc. 6th International Conference on Image and Video Retrieval (CIVR)*, pp. 280-287, 2007.

Jing et al., "VisualRank: Applying PageRank to Large-Scale Image Search," *IEEE Transaction on Pattern Analysis and Machine Intelligence*, vol. 30, No. 11, Nov. 2008, pp. 1877-1890.

Joachims, "Text Categorization with Support Vector Machines: Learning with Many Relevant Features," *Proc 10th European Conf on Machine Learning*, 1998, pp. 137-142.

Joshi et al., "The story picturing engine—a system for automatic text illustration", *ACM Transactions on Multimedia, Computing, Communications and Applications*, vol. 2, No. 1, pp. 68-89, 2006.

Kautz et al., "ReferralWeb: Combining Social Networks and Collaborative Filtering," *Communications of the ACM*, 1997, 40(3):1-4.

Ke et al., "Efficient near-duplicate detection and sub-image retrieval", in *Proc. ACM International Conference on Multimedia (ACM MM)*, pp. 869-876, 2004.

Ke et al., "Pca-sift: A more distinctive representation for local image descriptors", in *Proc. Conference on Computer Vision and Pattern Recognition (DVPR)*, vol. 2, pp. 506-516, 2004.

Kleinberg et al., "The Web as a graph: measurements, models, and methods" *Proceedings of the International Conference on Combinatronics*, 1999, 18 pages.

Kleinberg, "Authoritative sources in a hyperlinked environment", *Journal of the ACM*, vol. 46, No. 5, pp. 604-632, 1999.

Kondor et al., "Diffusion kernels on graphs and other discrete structures", in *Proc. 19th International Conference on Machine Learning (ICML)*, pp. 315-322, 2002.

Konstan et al. "Applying Collaborative Filtering to Usenet News" *Communications of the ACM*, Mar. 1997, vol. 40, No. 3, pp. 77-87.

Lazebnik et al., Asparse texture representation using affine-invariant regions, in *Proc. Conference on Computer Vision and Pattern Recognition (CVPR)*, vol. 2, pp. 319-324, 2003.

Leigh et al., "Transformation, Ranking, and Clustering for Face Recognition Algorithm Comparison," at http://www.itl.nist.gov/div898/itperf/renorm.pdf, 2002.

Liew, et al., "Social Networks," U.S. Appl. No. 60/552,718, filed Mar. 15, 2004, 9 pages.

Liu et al. "A Comparative Study on Feature selection and Classification methods Using Gene Expression Profiles and Proteomic Patterns" for *Genome Informatics* 13:, pp. 51-60, 2002.

Liu et al., "An Investigation of Practical Approximate Nearest Neighbor Algorithms," *Proc Neural Information Processing Systems*, 2004 at http://www.cs.cmu.edu/~tingliu/research.htm.

Lowe D.G., "Distinctive Image Features from Scale-Invariant Keypoints", *International Journal of Computer Vision (IJCV)*, vol. 60, No. 2, pp. 91-110, 2004.

Lowe, "Local Feature View Clustering for 3D Object Recognition," *CVPR 2001*, at http:/www.cs.ubc.ca/~lowe/papers/cvpr01.pdf.

Ma et al., "A toolbox for navigating large image databases", *Multimedia System*, vol. 3, No. 7, pp. 184-198, 1999.

Microsoft Corporation, "Is Friendster the 'Next Big Thing'?" at http://mobilemomentum.msn.com/article.aspx?aid=4, as available via the Internet and printed on Jul. 29, 2004.

Mikolajczyk et al., "A performance evaluation of local descriptors", *IEEE Transactions on Pattern Analysis and Machine Intelligence (TPAMI)*, vol. 27, No. 10, pp. 1615-1630, 2005.

Monay and Gatica-Perez, "On Image Auto-Annotation with Latent Space Models," MM'03, Nov. 2-8, 2003, pp. 275-278.

Multiply, "About Multiply," at http://multiply.com/info/about, as available via the Internet and.printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Nister et al., "Scalable recognition with a vocabulary tree", in *Proc. Conference on Computer vision and Pattern Recognition (CVPR)*, vol. 2, pp. 2161-2168, 2006.

Nowak et al., "Learning visual similarity measures for comparing never seen objects", in *Proc. Conference on Computer Vision and Pattern Recognition (CVPR)*, 2007.

Park et al., "Majority based ranking approach in web image retrieval", *Lecture Notes in Computer Science*, vol. 27-28, pp. 499-504, 2003.

Pentland et al., "Content-based manipulation of image databases", *International Journal of Computer Vision (IJCV)*, vol. 18, No. 3, pp. 233-254, 1996.

Philbin et al., "Object retrieval with large vocabularies and fast spatial matching", in *Proc. Conference on Computer Vision and Pattern Recognition (CVPR)*, 2007.

Pilaszy "Text Categorization and Support Vector Machines" *Computer Science*, vol. 1398, 1998, 10 pages.

Press Releases Facebook "Leading Websites Offer Facebook Beacon for Social Distribution" [online] [retrieved from the internet: http://www.facebook.com/press/releases.php?p9166] [retrieved on Jan. 24, 2008] 1 page.

Roach et al., "Video Genre Classification Using Dynamics," 2001, *Proc Acoustics, Speech, nd Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cvpr03.pdf.

Rowley et al., "Neural Network-Based Face Detection," *IEEE Transactions on Pattern Analysis and Machine Intelligence*, 1998, 20(1).

Ruthven I., et al., "A survey on the use of relevance feedback for information access systems", [online] [retrieved on Apr. 22, 2010]. pp. 1-53. http:www.dcs.qmul.ac.uk/~mounia/CV/Papers/ker_ruthven_lalmas.pdf.

Schindler et al., "city-scale location recognition", in *Proc. Conference on Computer Vision and Pattern Recognition (CVPR)*, 2007.

Sebastiani, "Machine Learning in Automated Text Categorization" *ACM Computing Surveys*, vol. 34, No. 1, Mar. 2002, pp. 1-47.

Simon et al., "Scene summarization for online image collections", in *Proc. 12th International Conference on Computer Vision (ICCV)*, 2007.

Smeulders et al., "Content-based image retrieval at the end of the early years", *IEEE Transactions on Pattern Analysis and Machine Intelligence (TPAMI)*, vol. 22, No. 12, pp. 1349-1380, 2000.

Sullivan, Danny, "Is It Really Personalized Search?" http://searchenginewatch.com printed on May 13, 2004.

Szummer and Jaakkola, "Partially labeled classification with Markov random walks," *NIPS 2001*.

Tribe.net, "Listings Directory," at http://www.tribe.net/tribe/servlet/template/pub.Listings.vm, as.available via the Internet and printed on Jun. 28, 2004.

Uchihashi et al., "Content-free image retrieval by combinations of keywords and user feedbacks", in *Proc. 5th International Conference on Image and Video Retrieval (CIVR)*, pp. 650-659, 2005.

Veltkamp and Tanase, "Content-Based Image Retrieval Systems: A Survey" Technical Report UU-CS-2000-34, pp. 1-62, 2000.

Viola and Jones, "Robust Real Time Face Detection," *Int J Computer Vision*, 2004 at http://scholar.google.com/scholar?hl=en&lr=&cluster=10098362814192689387.

Wang et al., "AnnoSearch: Image Auto-Annotation by Search," *CVPR 2006*.

Weinberger et al., "Distance metric learning for large margin nearest neighbor classification", in *Proc. 18th Conference on Advances in Neural Information Processing Systems (NIPS)*, vol. 18, pp. 1437-1480, 2006.

Winder et al., "Learning local image descriptors", in *Prof Conference on Computer Vision and Pattern Recognition (CVPR)*, 2007.

Xing et al., "Distance metric learning, with applications to clustering with side-information", in *Proc. 15th Conference on Advances in Neural Information Processing Systems (NIPS)*, vol. 15, pp. 450-459, 2002.

Yang and Pedersen, "A Comparative Study on Feature Selection in Text Categorization Source," *Proc 14th Intl Conf Machine Learning*, 1997, pp. 412-420.

Yang et al., "Mining Social Networks for Targeted Advertising," *Proceedings of the 39th Hawaii International Conference on System Sciences*, 2006.

Zeff et al., *Advertising on the Internet*, 2nd ed., John Wiley & Sons, 1999.

Zhang, J. 'Facebook unveils school-specific advertisements' [online]. The Stanford Daily, 2005, [retrieved on Jun. 14, 2006]. Retrieved from the Internet: <URL: www.daily.stanford.edu/tempo?page=content&id=15553&repository=0001_article>, 3 pages.

Zhou and Schökopf, "Learning from Labeled and unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

\* cited by examiner

NON-TEXT CONTENT ITEM SEARCH

CROSS-REFERENCE TO RELATED APPLICATIONS

This application claims the benefit under 35 U.S.C. §119(e) of U.S. Patent Application No. 61/308,547 entitled "Non-Text Content Search," filed Feb. 26, 2010, which is incorporated herein by reference in its entirety.

BACKGROUND

This specification relates to facilitating content searching.

The Internet provides access to a wide variety of resources. For example, video files, audio files, web pages for particular subjects, book articles, and news articles are accessible over the Internet. A search system can identify resources in response to a search query that includes one or more search terms or phrases. The search system ranks the resources based on result scores corresponding to the resources and provides search results that link to the identified resources. The search results are typically ordered for viewing according to the ranking selected based on the result scores. The result scores can be computed, for example, based on how well data corresponding to the resource matches the search query and on measures of quality of the resources.

Image resources are resources that are provided in an image file format (e.g., JPEG (Joint Photographic Experts Group), TIFF (Tagged Image File Format), Bitmap, or other image file formats). To search image resources, a search system can determine how well images match the text of the search query, for example, using textual content of a web page in which the image is located, and sometimes based on relevance feedback associated with the image. For example, an information retrieval score measuring the relevance of a text query to the content of a web page can be combined with a click through rate of an image presented on that web page to generate an overall search result score for the image.

Textual content associated with an image can often be a reliable indicator of a topic and/or subject matter to which the image is related. However, it is possible that images unrelated to the query may be identified in search results responsive to the query if the textual content mischaracterizes the content of the image or is otherwise unrelated to the image. Therefore, images may be selected to be referenced in search results in response to search queries that are unrelated to the topic specified by the search query.

SUMMARY

In general, one innovative aspect of the subject matter described in this specification can be embodied in methods that include the actions of selecting a non-text content item that is associated with each of a plurality of web pages; receiving label data that includes a set of initial labels for the non-text content item and a resource identifier for each initial label, wherein each initial label includes one or more words; selecting one or more sets of matching web pages from the plurality of web pages, wherein each set of matching web pages includes two or more matching web pages; grouping, for each set of matching web pages, initial labels that are associated with the set of matching web pages into a separate initial label group that corresponds to the set of matching web pages; selecting one or more sets of matching labels, wherein each set of matching labels includes two or more initial labels; grouping each set of matching labels into a separate initial label group that corresponds to the set of matching labels; and selecting, as a final label for the non-text content item, an n-gram of one or more words that are included in at least a threshold number of separate initial label groups.

These and other embodiments can each optionally include one or more of the following features. Methods can further include the actions of receiving a search query; determining that the search query matches the final label for the non-text content item; and in response to the determination that the search query matches the final label, increasing a result score for the non-text content item, wherein the result score is a score with which a presentation order for non-text content items is selected.

Methods can further include the actions of selecting, based on the result scores, a presentation position for the non-text content item; and providing data that cause presentation of the non-text content item at a presentation position according to the presentation order.

Determining that the search query matches the final label can include determining that at least one same term is included in the search query and the final label. Increasing the result score for the non-text content item can include multiplying a baseline result score for the non-text content item by a boost factor having a value greater than 1.0.

Methods can further include the action grouping at least one unique query into a separate initial label group, a unique query being a query that has not been grouped into one of an initial label group corresponding to a set of matching web pages and an initial label group corresponding to a set of matching labels.

Methods can further include the actions of computing a match score representing a measure of match between the search query and the final label; and selecting the boost factor based on a value of the match score. Selecting the boost factor can include selecting a boost factor that is proportional to the match score. Selecting a non-text content item that is associated with each of a plurality of web pages comprises selecting at least one of image content, audio content, video content, and multimedia content that is associated with each of a plurality of web pages.

Receiving label data that includes a set of initial labels can include receiving text that is provided for presentation within a threshold number of pixels of the non-text content item. Receiving label data that includes a set of initial labels can include receiving metadata for the web page with which the non-text content item is associated.

Selecting sets of matching web pages can include selecting web pages corresponding to a same domain. Selecting sets of matching web pages can include selecting web pages that are provided for a same publisher. Selecting one or more sets of matching labels can include selecting two or more labels that include at least one same word. Selecting one or more sets of matching labels can include selecting two or more labels that each include a word that corresponds to a same concept. Selecting one or more sets of matching labels can include selecting labels that have at least a threshold cosine similarity measure.

Particular embodiments of the subject matter described in this specification can be implemented so as to realize one or more of the following advantages. Search result quality can be improved by selecting a non-text content item that is responsive to a search query using labels that have been associated with the a non-text content item by at least a threshold number of different sources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Final labels are selected for a non-text content item (i.e., content provided in a non-text file format) from n-grams of text (i.e., individual words and/or sets of n contiguous words) that are included in initial labels that have been obtained for the non-text content item. The initial labels can be obtained, for example, from a data store that stores an index of initial labels, references to non-text content items with which the labels are associated, and resources with which the non-text content items are associated. Non-text content items are associated with a resource (e.g., a web page), based on a reference to the non-text content (e.g., a hyper-link to the non-text content, a file location of the non-text content, and/or a code snippet that causes the non-text content to be presented with the resource) being included in data representing the resource. The labels can be grouped into label groups based on the content of the labels themselves and/or the resources (e.g., web pages) with which the labels are associated.

For example, sets matching labels (i.e., labels having at least a minimum label similarity, as described below) can be respectively grouped into separate label groups that correspond to the sets of matching labels. Similarly, labels associated with a particular set of matching resources can be grouped into a label group that corresponds to the sets of matching resources.

The labels in each of the label groups are analyzed to identify n-grams of text that are included in each of the label groups. In turn, a number of groups in which each n-gram has been identified is determined, and each n-gram that is included in at least a threshold number of label groups is selected as a final label for the a non-text content item.

Once final labels have been selected for the a non-text content item, the final labels can be used to select a non-text content item that is responsive to the search query and adjust result scores for the non-text content item based on how well the final labels for the a non-text content item match the search query. In turn, search results that reference content responsive to the search query are provided for presentation according to a presentation order that is selected based on the values of the result scores post-adjustment.

Figure 1:
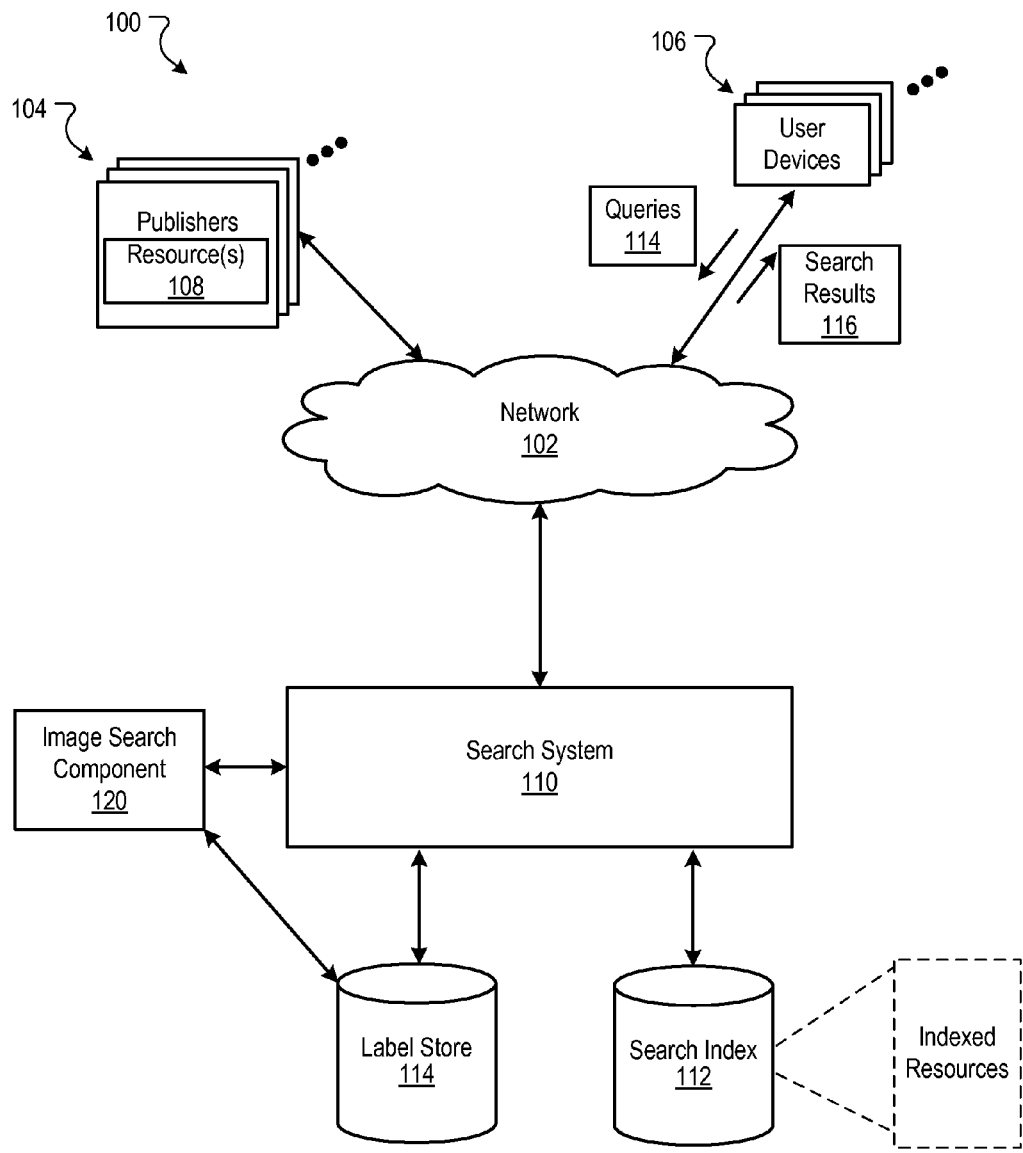
FIG. 1 is a block diagram of an example environment in which a search system provides search services.

FIG. 1 is a block diagram of an example environment 100 in which a search system 110 provides search services. The example environment 100 includes a network 102 (e.g., a local area network (LAN), wide area network (WAN), the Internet, or a combination of them) that connects publishers 104, user devices 106, and the search system 110. The environment 100 may include many thousands publishers 104 and user devices 106.

A web site is one or more resources 108 associated with a network domain and hosted by one or more servers. An example web site is a collection of web pages formatted in hypertext markup language (HTML) that can contain text, images, multimedia content, and programming elements, e.g., scripts. Each web site is maintained by a publisher 104 (i.e., an entity that manages and/or owns the web site).

A resource 108 is any data that can be provided by the web site over the network 102 and that is associated with a resource address. Resources 108 include HTML pages, word processing documents, and portable document format (PDF) documents, images, video, and feed sources, to name just a few. The resources 108 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application (e.g., a web browser) to facilitate the sending and receiving of data over the network 102, as well as presentation of data to a user.

To facilitate searching of resources 108, the search system 110 identifies the resources 108 by crawling and indexing the resources 108 provided by the publishers 104. Data about the resources 108 can be indexed based on the resource 108 to which the data corresponds as well as metadata for the corresponding resource. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 109, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text, an image, or a portion of an image extracted from the web page, and the URL of the web page.

User devices 106 receive the search results 116 and render the search results 116, for example, in the form of one or more web pages, for presentation to users. In response to user selection of a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search results 116 are selected to be provided to a user device 106 in response to a search query 114 based on initial result scores. Result scores are scores that represent a measure of responsiveness of the resource 108 to a search query. For example, a result score for a resource 108 can be computed based on an information retrieval ("IR") score for the resource 108, and, optionally, a quality score of the resource 108 relative to other available resources. In some implementations, the result score is based on a dot product of the IR score and the quality score, but other mathematical operations can be used to compute the result scores. Using the result scores, a presentation order for the search results 116 can be selected. In turn, data that causes presentation of the search results 116 according to the presentation order can be provided to the user device 106.

The search system 110 can compute an IR score for a resource based, for example, on how well data corresponding to the resource matches the search query. For example, resources (e.g., web pages) that include text content that matches the search query can have a higher IR score than resources that do not include text matching the search query. Similarly, resources having metadata, such as a file name, that matches the search query can have a higher IR score than resources that do not have metadata that matches the search query.

Text that matches the search query includes text that is the same as the search query. For example, if the search query "football" is received from a user device, resources that include the text "museum" or have corresponding metadata that includes the text "football," will match the search query, and the IR scores for these resources can be computed based on how the text "football" is associated with the resource (e.g., content presented in the resource or metadata corresponding to the resource), and/or often the text "football" is used within the resource or to describe the resource.

Text that matches the search query can also include text that is not the same as the search query, but has been determined to correspond to a similar concept or similar subject matter as the search query. For example, text clustering techniques can be used to identify multiple terms that refer to similar subject matter based on previous search queries that have been received from user devices, search results that were presented in response to the search queries and, in turn, selected by users, and data (e.g., text) associated with resources that were referenced by the selected search queries. Similarly, text that are stubs of search queries, plural forms, gerund forms, and/or various tenses of search queries, as well as other text related to the search query (e.g., synonyms) can match the search query.

The search system 110 can also compute IR scores for a non-text content item. A non-text content item is a content item that is provided in a non-text file format. Non-text content items includes image content items, video content items provided in video file formats, audio content items provided in audio file formats (e.g., content provided in audio file formats (e.g., WAV (Waveform Audio File Format), MP3 (MPG-1 Audio Layer 3), or other audio file formats), or other multimedia content items provided in multimedia file formats (e.g., content items provided in MPEG program streams, 3GPP file format, AVI (Audio Video Interleave), or other multimedia formats).

A non-text content item can include representations of text that are provided in a non-text format, such as an image file format (e.g., JPEG (Joint Photographic Experts Group), TIFF (Tagged Image File Format), Bitmap, or other image file formats), or a multimedia format (e.g., MPEG program streams, 3GPP file format, AVI (Audio Video Interleave), or other multimedia formats). For example, an image of a person wearing a shirt that has the text "Brand X" presented in a JPEG format can be a non-text content item because, although the image presented includes text, the data that causes presentation of the image is an image file format.

The search system 110 can compute the IR score for a non-text resource using text that is associated with the non-text resource. Text is associated with the non-text content item based on its proximity to the non-text content item when the text and non-text content item are presented, or being included in metadata for the non-text content item or meta data for a web page with which the non-text content is presented. For example, text that is associated with a non-text content item can include metadata (e.g., file names, corresponding descriptions, authorship data, and other data corresponding to the non-text resource), and/or text that is presented within a threshold distance of the non-text content item ("proximate text").

For example, the search system 110 can use the metadata corresponding to the non-text content item and/or select labels for the non-text content item based on proximate text for the non-text content item, one or more file names associated with the non-text content item, page and/or section titles corresponding to a presentation position of the non-text content item, and/or user feedback corresponding to the non-text content item (e.g., descriptive text provided by users to which the image has been presented). Once labels have been selected for the a non-text content item, the search system 110 can use the labels to compute the IR score for the non-text, for example, based on how well the labels match the search query.

A particular image (or set of similar images) is often presented with many different web pages. Therefore, many different labels are often used to describe the same or similar set of images. For example, assume that an image of a famous actress, Ima Celebrity, that was taken at an awards show. This image may be presented on a news web page, a blog web page that provides information about celebrities, and a fan club web page for Ima Celebrity. Thus, the label that the search engine 110 selects from the news page may be, for example, "The Awards Show Was a Hit;" the label the search engine 110 selects from the blog may be "Ima Celebrity on the Red Carpet at the Awards Show," and the label the search engine selects from the fan club web page may be "Ima Celebrity Pictures."

In this example, the image of the celebrity may be identified as responsive to each of the search queries "awards show," "carpet," and "Ima Celebrity." However, the users that submit the search query "Ima Celebrity," or "awards show" might be more interested in receiving search results that reference the image of Ima Celebrity than those users submitting the search query "carpet."

In some implementations, initial labels are analyzed, as described in more detail below, to select final labels (i.e., a proper subset of the initial labels) that may match search queries that are more likely to accurately describe content of the a non-text content item than search queries that match initial labels.

The search system 110 includes an image search component 120 that is configured to select final labels for a non-text content item (e.g., images, video, audio, or other multimedia content) based on label data that is received, for example, from a label store 114 (i.e., a data store storing label data for a non-text content item). The label data can specify initial labels that are associated with (i.e., correspond to) a particular non-text content item (e.g., a particular image or particular multimedia content) and also include, for each initial label, a resource identifier, such as a URL, identifying a resource to which the label corresponds, as well as a reference to the a non-text content item to which the label corresponds.

In some implementations, the image search component 120 selects, as final labels, n-grams of text that are included in at least a threshold number of labels corresponding to different resources. For example, the image search component 120 can require that a final label be a bi-gram of text that is included in at least 3 initial labels that were selected from 3 separate label groups. Label groups are sets of labels that have been grouped together based on the labels having a same characteristic. Some label groups include labels that are received from a set of matching resources, while other label groups include a set of matching labels from different resources.

A set of matching resources (e.g., a set of matching web pages) includes two or more resources that have at least one matching resource feature. In some implementations, the set of matching resources is a set of web pages that correspond to a same domain and/or a same publisher. For example, the web page located at the URL http://www.example.com/news, and the web page located at the URL http://www.example.com/sports both correspond to the domain example.com.

Similarly, two web pages that are known to be provided for a same publisher can be identified as matching web pages. For example, assume that the web sites exampleA.com and exampleB.com are a blog web site and a social networking site for a same user. In this example, although the web sites correspond to different domains, the image search component 120 can identify resources provided by the two web sites as matching resources.

A set of matching labels includes two or more labels. The two or more labels are identified as matching by having at least a minimum specified similarity. In some implementations, the set of matching labels can include two or more labels that have label similarity scores that exceed a label similarity threshold. The label similarity score is a measure of similarity between two labels. For example, the label similarity score can be a measure of how many matching terms are in each of the labels. Similarly, the label similarity score can be a measure of how semantically similar the two labels are to a same concept. For example, the label similarity score can be a cosine similarity measure for a label relative to a reference label, a reference concept, or a reference topic. Additionally, the label similarity can also be based on language translations of labels that are similar. For example, the word "rose" in English is very similar to the word "rose" in German. In some implementations, the similarity threshold can be a minimum number of matching terms, a minimum cosine similarity measure, or a minimum value of another measure of similarity.

In some implementations, the image search component 120 selects sets of matching labels and labels associated with sets of matching web sites from label data that includes a set of initial labels for the a non-text content item. In turn, the image search component 120 groups each label in a particular set of matching labels to a same label group. Similarly, the image search component 120 can group each label associated with a resource in a particular set of matching resources to a same label group. Each label that is not included in a set of matching labels and does not correspond to (or not otherwise associated with) a resource that is included in a set of matching resources can be placed into its own label group, referred to as a unique label group.

Once all of the labels have been assigned to a group, the image search component 120 can analyze the labels from each group to select a set of n-grams (e.g., unigrams or bi-grams) for the label group. In turn, the image search component 120 determines, for each n-gram, a number of different label groups in which the n-gram is included, and selects n-grams that are included in at least a threshold number of label groups as final labels for the a non-text content item.

Throughout this specification, the image search component 120 is described with reference to selecting final labels for images and selecting images responsive to search queries. The image search component 120 can also select final labels for other non-text content items, such as audio, video, and multimedia content items. The image search component 120 can also select other non-text content items that are responsive to a search query using final labels corresponding to the other non-text content items. Similarly, processes described in this document can be used to select final labels for various non-text content items and select non-text content items that are responsive to a search query using the final labels.

Figure 2:
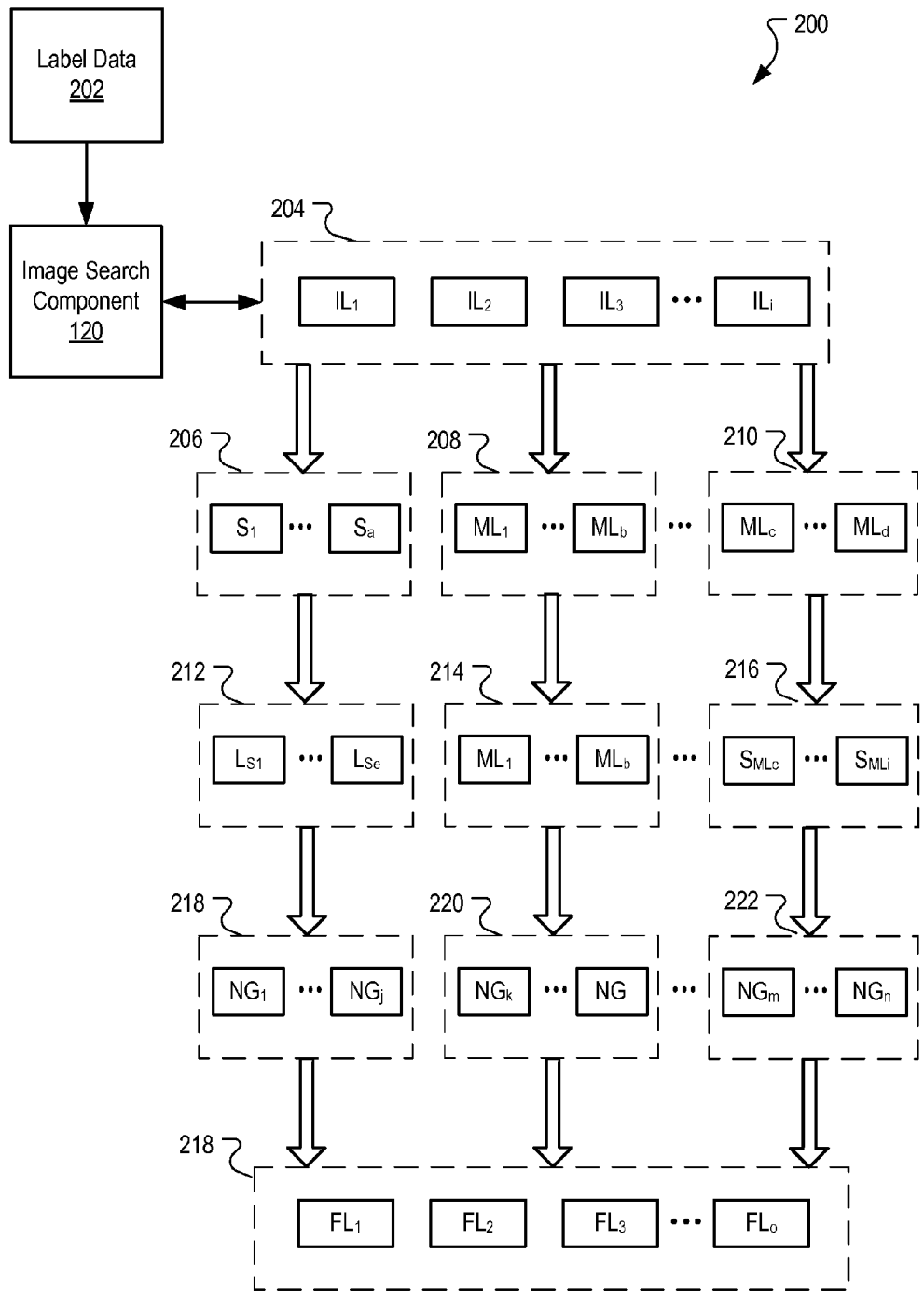
FIG. 2 is a block diagram illustrating data flows corresponding to selection of final labels for a non-text content item.

FIG. 2 is a block diagram illustrating data flows 200 corresponding to selection of final labels for a non-text content item. The image search component 120 receives label data 202 for one or more images (or other non-text content items). The label data 202 can be received, for example, from a data store that stores label data for content items.

Using the label data 202, the image search component 120 identifies a set of initial labels 204 for a particular image. The initial labels (IL1-ILi) are the labels that have been selected for the particular image. The initial labels (IL1-ILi) can be labels that were selected, for example, from text corresponding to many different web pages with which the particular image is presented. Each initial label can include a resource identifier, as described above.

The image search component 120 analyzes the set of initial labels 204 to identify sets of matching labels and analyzes resource identifiers to identify sets of matching web pages. For example, the image search system 120 can create a set of matching resources 206 (e.g., a set of web pages) that includes matching resources (S1-Sa) (e.g., matching web pages). The image search component 120 can also create a set of matching labels 208 that includes matching labels (ML1-MLb). As illustrated by the ellipses and the set of matching labels 210, separate sets of matching labels and matching labels can be iteratively created until all matching web pages and matching labels have been added to a set.

Once the image search component 120 has identified one or more sets of matching resources or matching labels, the image search component 120 groups initial labels from the sets of matching resources and matching labels into corresponding label groups (212-214). For example, the image search component 120 can generate a label group 212 that includes the initial labels (LS1-LSe) that correspond to the resources (S1-Sa) that are included in the set of matching resources 206. Similarly, the image search component 120 can generate a label group 214 that includes the initial labels (ML1-MLb) that are included in the set of matching labels 214. As illustrated by the ellipses and the label group 216, the image search component 120 can iteratively generate label groups that include labels from corresponding sets of matching resources and sets of matching labels. In some implementations, each initial label that is included in a label group is associated with data that identifies the resource of the initial label.

Once the initial labels have been included in, or otherwise assigned to, respective label groups, the image search component 120 selects sets of n-grams 218-222 (i.e., sets of unigrams and/or sets of two or more contiguous words) from each of the label groups 212-216. The image search component 120 can select unigrams, bi-grams, or any other n-gram of text from each of the sets of n-grams and includes an instance of each different n-gram in a set of n-grams corresponding to the label group. For example, the set of n-grams 218 corresponds includes n-grams (NG1-NGj) that are selected from the labels (LS1-LSa) in label group 212. Similarly, the set of n-grams 220 includes n-grams (NGk-NGl) and the set of n-grams 222 includes n-grams (NGm-NGn) that were respectively selected from the label groups 214 and 216.

The image search component 120 analyzes the n-grams and computes a number of label groups from which each particular n-gram was selected. Particular n-grams that were selected from at least a threshold number of label groups are identified as final labels (FL1-FLo) and included in a set of final labels 218. In turn, the set of final labels 218 are used to determined how well the non-text content item to which the set of final labels 218 corresponds matches a search query.

Figure 3:
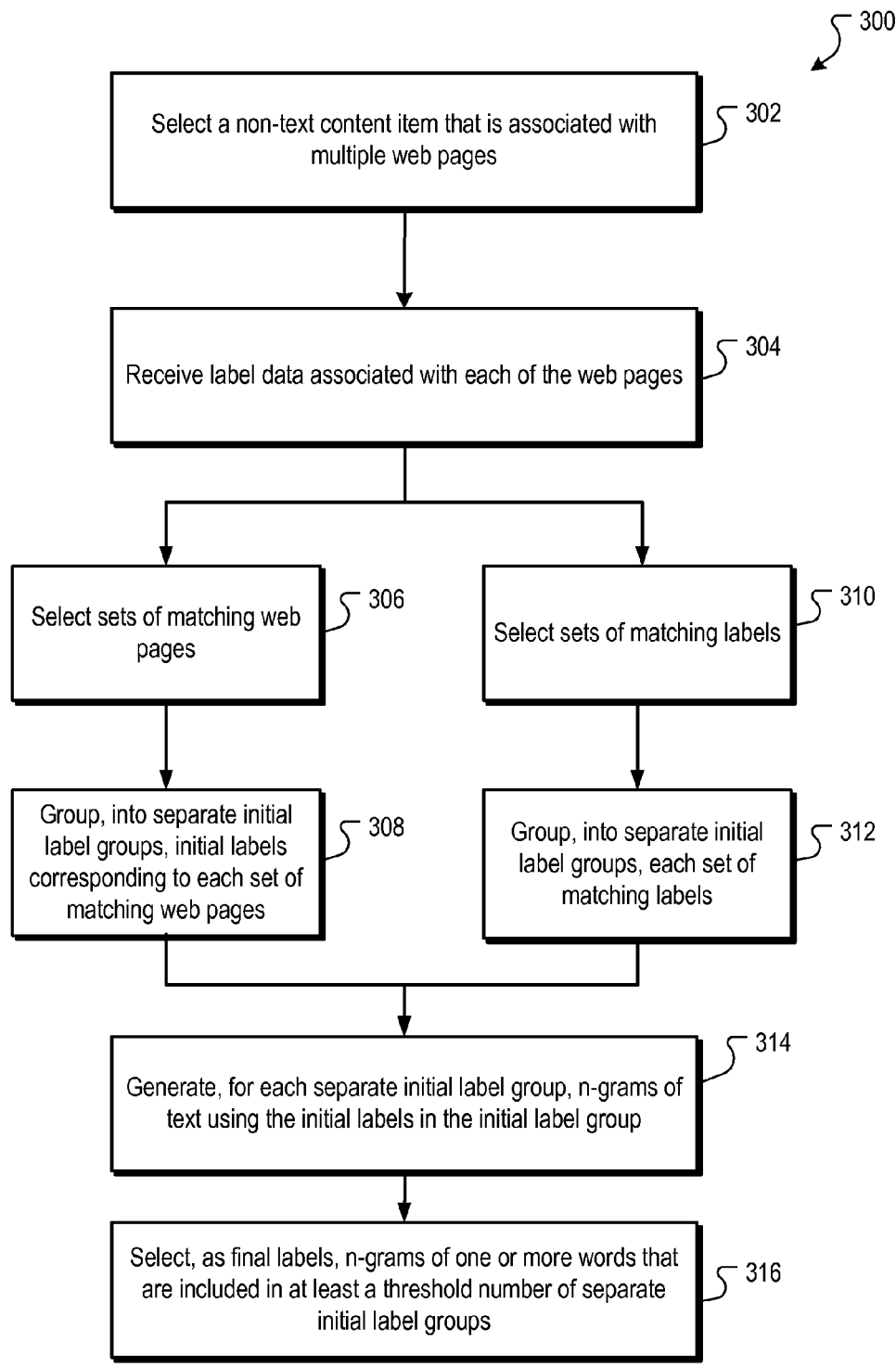
FIG. 3 is a flow chart of an example process for selecting final labels for a non-text content item.

FIG. 3 is a flow chart of an example process 300 for selecting final labels for a non-text content item. The process 300 is a process by which label data corresponding to selected a non-text content item is received. The label data is used to select sets of matching web pages with which the non-text content item is provided, and group initial labels from each set of matching web pages into a separate label group. The label data is also used to select sets of matching labels that include initial labels that are selected from the web pages with which the non-text content item is presented, and group each set of matching labels into a separate initial label group. In turn, n-grams of text that are included in at least a threshold number of separate initial label groups are selected for the non-text content item.

The process 300 can be implemented, for example, by the image search component 120 and/or the search system 110 of FIG. 1. In some implementations, the image search component 120 is a data processing apparatus that includes one or more processors that are configured to perform actions of the process 300. In other implementations, a computer readable medium can include instructions that when executed by a computer cause the computer to perform actions of the process 300.

A non-text content item that is associated with multiple web pages is selected (402). In some implementations, the non-text content item is an image content item, video content item, audio content item, or other multimedia content items. A non-text content item can include representations of text that are provided in a non-text format, such as an image file format (e.g., JPEG (Joint Photographic Experts Group), TIFF (Tagged Image File Format), Bitmap, or other image file formats), or a multimedia format (e.g., MPEG program streams, 3GPP file format, AVI (Audio Video Interleave), WAV (Waveform Audio File Format), or other multimedia formats. For example, an image of a person wearing a shirt that has the text "Brand X" presented in a JPEG format can be a non-text content item because, although the image presented includes text, the data that causes presentation of the image is an image file format.

A non-text content item that is associated with (e.g., provided with) multiple web pages can be selected, for example, from a data store that stores an index of non-text content items and corresponding references to resources with which the non-text content items have been selected to be provided. For example, a data store can include a reference to a particular image and corresponding references to web pages with which the images will be provided.

In some implementations, the web pages with which the particular non-text content is associated can be determined by identifying web pages with which a non-text content item that is substantially the same as the particular non-text content item, without requiring the non-text content item to match exactly. For example, cropped, reduced, or enlarged versions of a particular image can be identified as being substantially the same. Similarly, color variations, texture variations, resolution variations (e.g., images saved using different compressions), and other variations between different instantiations of a non-text content item can exist while still considering the different instantiations of the non-text content item to be the same non-text content item. For example, threshold feature value variations can be used to set a maximum variation that is allowed between two or more different instantiations of non-text content items that are considered to be the same non-text content item. When non-text content items are determined to be similar enough to be matching images, the initial labels for each of the images can be used to select final labels for the images. In turn, the final labels can be used as final labels for either, or both, of the matching images.

Label data corresponding to each web page with which the non-text content item is associated are received (304). In some implementations, the label data specifies a set of initial labels for the selected non-text content item. The label data for each web page can include a resource identifier that identifies the web page and text that has been identified as being associated with and/or descriptive of the non-text content item.

For example, the label data can include, for each initial label, a Uniform Resource Locator, or another network address from which the initial label was obtained. The text that has been identified as being associated with and/or descriptive of the non-text content item can be text that is presented within a threshold number of pixels of and/or within a same section of the web page as the non-text content item to which the initial label corresponds. The text that has been identified as descriptive of the non-text content item can also include text that has been received from users to which the image was presented (i.e., the non-text content item can be labeled by users). The text that has been identified as descriptive of the non-text content item can further include metadata corresponding to the non-text content item, such as a file name, author name, creation date, or other metadata.

Once the label data has been received, sets of matching web pages are selected (306) and/or sets of matching labels are selected (310). The sets of matching web pages and sets of matching labels can be selected in parallel, or in any serial order. In some implementations, only one of the sets of matching web pages or the sets of matching labels can be selected.

For selecting a set of matching web pages (306), the set of matching web pages includes two or more web pages that have at least one matching web page feature. Web page features include web page titles, domains corresponding to web pages, publishers of the web pages, among other features. In some implementations, a set of matching web pages includes all web pages that belong to a same domain (i.e., have a same domain address) and provide the same particular non-text content item. For example, a "front" page of a news website, and an "entertainment" page of the new website may both include the same image of the celebrity "Ima Celebrity." In this example, the "front" page and the "entertainment" page are matching web pages. As described above, in some implementations, matching web pages can also include web pages that may not correspond to a same domain, but are controlled by a same publisher, and/or provided for the same publisher.

When a set of matching web pages includes web pages that correspond to a same domain and provide the same particular non-text content item, the set of matching web pages can be identified using the label data. For example, the label data can be analyzed to identify resource identifiers that correspond to a same domain and select these resource identifiers for inclusion in the set of matching web pages.

Once one or more sets of matching web pages have been identified, the initial labels corresponding to each set of matching web pages are respectively grouped into separate initial label groups (308). For example, assume that two sets of matching web pages (set A and set B) have been selected. In this example, the initial labels corresponding to each web page that is referenced in set A will be grouped into a corresponding initial label group (e.g., initial label group A). Similarly, the initial labels corresponding to each web page that is referenced in set B will grouped into a separate corresponding initial label group (e.g., initial label group B). The initial labels that correspond to a particular set of matching web pages can be determined, for example, based on resource identifiers for the initial labels.

For selecting sets of matching labels (310), a set of matching labels includes two or more initial labels. The initial labels can be, for example, a label similarity score that exceeds a similarity threshold. A label similarity score is a value that represents a measure of similarity between two or more labels. For example, labels that are not at all similar can have a label similarity score of 0.0, while labels that are exactly the same can have a label similarity score of 1.0. In this example, other labels can have label similarity scores between 0.0 and 1.0 based on how closely the labels match.

In some implementations, the label similarity score can be based on how many matching words are included in two or more labels. For example, a label similarity score for two labels that each include three of the same words can have an image similarity score that is higher than the image similarity score for two images that each include one same word. In these implementations, the image similarity threshold can correspond to a minimum number of matching words required to be included in each of the two labels for the labels to be identified as matching labels. For example, the image similarity threshold can be set to a value that requires two or more labels to each include at least one same word in order for the image similarity scores of the labels to exceed the image similarity threshold.

In other implementations, labels that do not include the same words, but each include one or more words that correspond to a same concept (or reference label) can be selected as matching labels. For example, assume that a picture of a football player corresponds to the labels "Professional Football" and "Sports." Although these labels do not include the same words, both labels may be identified as corresponding to the concept "sports." Therefore, each of these labels may be selected to be included in a set of matching labels for the label "Sports." Two labels can be identified as corresponding to a same concept, for example, based on clustering techniques, as described with reference to FIG. 1, or based on cosine similarity measures. When cosine similarity measures are used, matching labels can be identified as labels having, for example, at least a threshold cosine similarity measure relative to a reference label, a reference concept, or a reference topic.

Once one or more sets of matching labels have been selected, each set of matching labels are respectively grouped into separate initial label groups (312). For example, assume that two sets of matching labels (set C and set D) have been selected. In this example, the matching labels in set C will be grouped into a corresponding initial label group (e.g., initial label group C). Similarly, the matching labels in set D will grouped into a separate corresponding initial label group (e.g., initial label group D).

N-grams of text are generated for each of the separate initial label groups using the initial labels that are in the initial label groups (314). In some implementations, the n-grams of text that are generated include each unigram and each set of n contiguous words in the label. For example, assuming that bi-grams of text are being generated for the label "Ima Celebrity Photos," the n-grams of text that are generated can include "Ima Celebrity," and Celebrity Photos."

N-grams of one or more words that are included in at least a threshold number of separate initial label groups are selected as final labels (316). In some implementations, n-grams (i.e., one or more words) that are included in at least 3 different initial label groups are selected as final labels for a corresponding non-text content item. Continuing with the example above, if a same bi-gram is included in initial label groups A, C, and D, then that bi-gram will be selected as a final label for the corresponding non-text content item because the bi-gram is included in 3 different initial label groups.

Once the final labels are selected for a particular non-text content item, the final labels can be used to determine whether the particular non-text content item is responsive to a search query. The final labels can also be used to increase a baseline result score for the non-text content item when one or more final labels for the non-text content item matches the search query. In turn, a presentation position can be selected to present a reference to the non-text content item in search results responsive to the search query.

Figure 4:
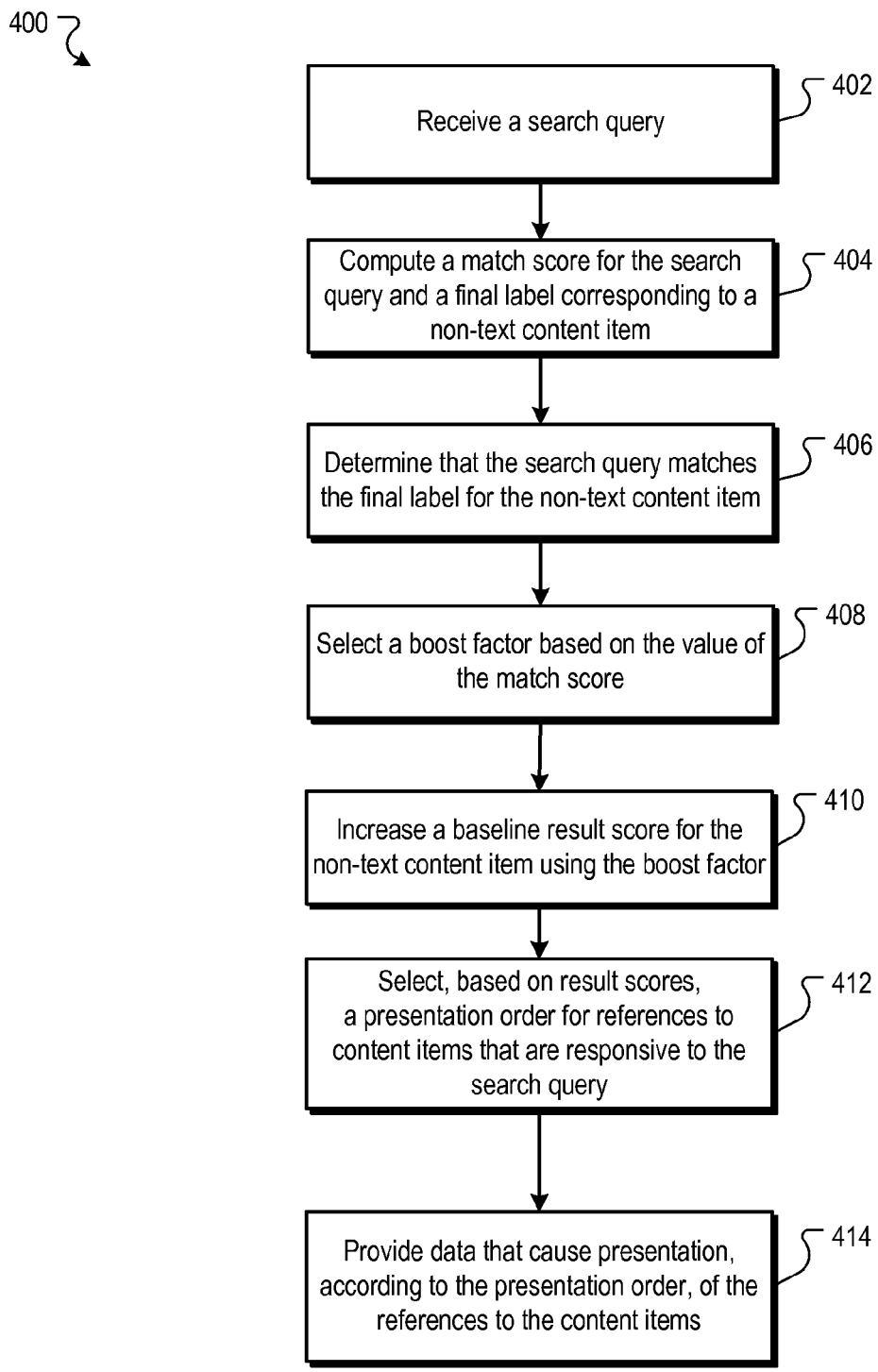
FIG. 4 is a flow chart of an example process for selecting a non-text content item that is responsive to a search query.

FIG. 4 is a flow chart of an example process 400 for selecting a non-text content item that is responsive to a search query. The process 400 is a process by which a match score is computed for a final label corresponding to a non-text content item relative to a search query. When it is determined, based on the match score, that the search query matches the final label for the non-text content item, a boost factor for the non-text content item is selected and used to adjust a result score for the non-text content item. In turn, a presentation order is selected for search results that include references to content items responsive to the search query and using the result scores.

The process 400 can be implemented, for example, by the image search component 120 and/or the search system 110 of FIG. 1. In some implementations, the image search component 120 is a data processing apparatus that includes one or more processors that are configured to perform actions of the process 400. In other implementations, a computer readable medium can include instructions that when executed by a computer cause the computer to perform actions of the process 400.

A search query is received (402). The search query can be received, for example, from a user device that submitted the search query, from a search system, or another processing system that received the search query from the user device.

A match score is computed for a final label corresponding to the non-text content item and the search query (404). In some implementations, the match score is a measure of match between the search query and the final label. For example, a final label that is exactly the same as the search query can have a match score of 1.0, and other final labels that may be similar to the search query, but not an exact match, can have match scores less than 1.0. The match score can be computed in a manner similar to that described for computing a label similarity score, as described above.

When more than one final label corresponds to the non-text content item, a separate match score can be computed for each final label that corresponds to the non-text content item. In turn, a final match score can be selected or computed using the separate match scores. For example, the separate match score having a highest value can be selected as the final match score. Alternatively, the match score can be a function of the separate match scores (e.g., a logarithmic function of the match scores or another function of the match scores).

A determination that the search query matches the final label for the non-text content item is made (406). In some implementations, the determination that the search query matches the final label is made based on a determination that at least one same term is included in the search query and the final label. In other implementations, the determination is made based on the match score for the final label and the search query exceeding at least a minimum specified match score.

A boost factor is selected based on the value of the match score (408). In some implementations, the boost factor is a value greater than 1.0 that is used to increase a baseline result score. For example, the boost factor can be a number between 1.01 and 1.3 that is multiplied with a baseline result score to obtain a final result score. In other implementations, the boost factor can also be a value less than 1.0 so that result scores of non-text content item having labels that do not match the search query very well can be reduced. The selected boost factor can be, for example, a value that is proportional to the match score for the non-text content item. For example, the boost factor selected for a non-text content item corresponding to a match score of 0.9 can be higher than the boost factor that is selected for another non-text content item that corresponds to a match score of 0.5.

The baseline result score for the non-text content item is adjusted using the boost factor (410). The baseline result score is a result score that can be received, for example, from a search system. In some implementations, the baseline result score is adjusted by multiplying the baseline result score by the boost factor. In other implementations, the baseline result score can be adjusted by applying the boost factor to the baseline result score using other mathematical operations (e.g., addition, subtraction, exponentials, or logarithms).

A presentation order is selected for references to content items that are responsive to the search query (412). The references to the content items can be, for example, search results that reference non-text content items and/or text content items. In some implementations, the presentation order is based on the baseline result scores that were not adjusted using a boost factor and the adjusted result scores. The presentation order can be selected, for example, so that content items corresponding to a higher result score is presented in a higher (or more prominent) presentation position, while content items corresponding to a lower result score is presented at a lower (or less prominent) presentation position.

Data that cause presentation of the references to content items according to the presentation order are provided (414). In some implementations, the provided data can cause presentation of search results in one or more web pages presented by a browser operating on the user device that submitted the search query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A system, comprising:
    a data store storing label data that specifies a set of initial labels for a non-text content item and a resource identifier that specifies, for each initial label, a web page to which the initial label is associated, wherein the non-text content item is associated with each of a plurality of web pages, and wherein each initial label includes one or more words; and
    one or more computers coupled to the data store, the one or more computers configured to:
        generate initial label groups for sets of matching web pages, each set of matching web pages including two or more matching web pages;
        group, for each set of matching web pages, initial labels that are associated with the set of matching web pages into a separate initial label group that corresponds to the set of matching web pages;
        generate initial label groups for sets of matching labels, each set of matching labels including two or more initial labels;
        group, for each set of matching labels, initial labels that are associated with the set of matching labels into a separate initial label group that corresponds to the set of matching labels; and
        select, as final labels for the non-text content item, n-grams of one or more words that are included in at least a threshold number of the separate initial label groups.

2. The system of claim 1, wherein the non-text content item comprises content that is provided in a non-text format.

3. The system of claim 1, wherein the non-text content item comprises at least one of audio, video, and multimedia content.

4. The system of claim 1, wherein the one or more computers are further configured to select, as a set of matching web pages, web pages corresponding to a same domain.

5. The system of claim 1, wherein the one or more computers are further configured to select, as a set of matching web pages, web pages that are provided for a same publisher.

6. The system of claim 1, wherein the one or more computers are further configured to select, as a set of matching labels, initial labels having a label similarity score that exceeds a label similarity threshold.

7. The system of claim 1, wherein the one or more computers are further configured to select, as a set of matching labels, initial labels that each include at least one same word.

8. The system of claim 1, wherein the one or more computers are further configured to select, as a set of matching labels, initial labels that have at least a specified threshold cosine similarity measure.

9. The system of claim 1, wherein the one or more computers are further configured to receive a search query, determine that a final label matches the search query, and adjust, using a boost factor, a baseline result score for content corresponding to the final label that matches the search query.

10. The system of claim 9, further comprising a user device, wherein the one or more computers are further configured to select a presentation order for search results using the adjusted result scores and provide data to the user device that causes presentation of the search results by the user device and according to the presentation order.

11. The system of claim 1, wherein the set of initial labels comprises text that is provided for presentation within a threshold number of pixels of the non-text content item.

12. The system of claim 1, wherein the set of initial labels comprises metadata for the web page with which the initial label is associated.

13. A non-transitory computer storage medium encoded with a computer program, the program comprising instructions that when executed by data processing apparatus cause the data processing apparatus to perform operations comprising:
   receiving label data that specifies a set of initial labels for a non-text content item and a resource identifier for each initial label, wherein each initial label includes one or more words;
   selecting one or more sets of matching web pages from a plurality of web pages, wherein each set of matching web pages includes two or more matching web pages;
   grouping, for each set of matching web pages, initial labels that are associated with the set of matching web pages into a separate initial label group that corresponds to the set of matching web pages;
   selecting one or more sets of matching labels, wherein each set of matching labels includes two or more initial labels;
   grouping each set of matching labels into a separate initial label group that corresponds to the set of matching labels; and
   selecting, as a final label for the non-text content item, an n-gram of one or more words that are included in at least a threshold number of separate initial label groups.

14. The non-transitory computer storage medium of claim 13, wherein receiving label data specifying a set of initial labels for a non-text content item comprises receiving a set of initial labels for content that is provided in a non-text format.

15. The non-transitory computer storage medium of claim 13, wherein the program further comprises instructions that when executed by the data processing apparatus cause the data processing apparatus to perform operations comprising selecting, as a set of matching web pages, web pages that are provided for a same publisher.

16. The non-transitory computer storage medium of claim 13, wherein the program further comprises instructions that when executed by the data processing apparatus cause the data processing apparatus to perform operations comprising selecting, as a set of matching labels, initial labels having a label similarity score that exceeds a label similarity threshold.

17. A method performed by data processing apparatus, the method comprising:
   selecting a non-text content item that is associated with each of a plurality of web pages;
   receiving label data that includes a set of initial labels for the non-text content item and a resource identifier for each initial label, wherein each initial label includes one or more words;
   selecting one or more sets of matching web pages from the plurality of web pages, wherein each set of matching web pages includes two or more matching web pages;
   grouping, for each set of matching web pages, initial labels that are associated with the set of matching web pages into a separate initial label group that corresponds to the set of matching web pages;
   selecting one or more sets of matching labels, wherein each set of matching labels includes two or more initial labels;
   grouping each set of matching labels into a separate initial label group that corresponds to the set of matching labels; and
   selecting, as a final label for the non-text content item, an n-gram of one or more words that are included in at least a threshold number of separate initial label groups.

18. The method of claim 17, further comprising:
   receiving a search query;
   determining that the search query matches the final label for the non-text content item; and
   in response to the determination that the search query matches the final label, increasing a result score for the non-text content item, wherein the result score is a score with which a presentation order for non-text content items is selected.

19. The method of claim 18, further comprising:
   selecting, based on the result scores, a presentation position for the non-text content item; and
   providing data that cause presentation of the non-text content item at a presentation position according to the presentation order.

20. The method of claim 18, wherein determining that the search query matches the final label comprises determining that at least one same term is included in the search query and the final label.

21. The method of claim 18, wherein increasing the result score for the non-text content item comprises multiplying a baseline result score for the non-text content item by a boost factor having a value greater than 1.0.

22. The method of claim 21, further comprising:
   computing a match score representing a measure of match between the search query and the final label; and
   selecting the boost factor based on a value of the match score.

23. The method of claim 22, wherein selecting the boost factor comprises selecting a boost factor that is proportional to the match score.

24. The method of claim 17, wherein selecting a non-text content item that is associated with each of a plurality of web pages comprises selecting at least one of image content, audio content, video content, and multimedia content that is associated with each of a plurality of web pages.

25. The method of claim 17, wherein receiving label data that includes a set of initial labels comprises receiving text that is provided for presentation within a threshold number of pixels of the non-text content item.

26. The method of claim 17, wherein receiving label data that includes a set of initial labels comprises receiving metadata for the web page with which the non-text content item is associated.

27. The method of claim 17, wherein selecting sets of matching web pages comprises selecting web pages corresponding to a same domain.

28. The method of claim 17, wherein selecting sets of matching web pages comprises selecting web pages that are provided for a same publisher.

29. The method of claim 17, wherein selecting one or more sets of matching labels comprises selecting two or more labels that include at least one same word.

30. The method of claim 17, wherein selecting one or more sets of matching labels comprises selecting two or more labels that each include a word that corresponds to a same concept.

31. The method of claim 17, wherein selecting one or more sets of matching labels comprises selecting labels that have at least a threshold cosine similarity measure.

32. The method of claim 17, further comprising grouping at least one unique query into a separate initial label group, a unique query being a query that has not been grouped into one of an initial label group corresponding to a set of matching web pages and an initial label group corresponding to a set of matching labels.

\* \* \* \* \*